United States Patent Office 2,858,794
Patented Nov. 4, 1958

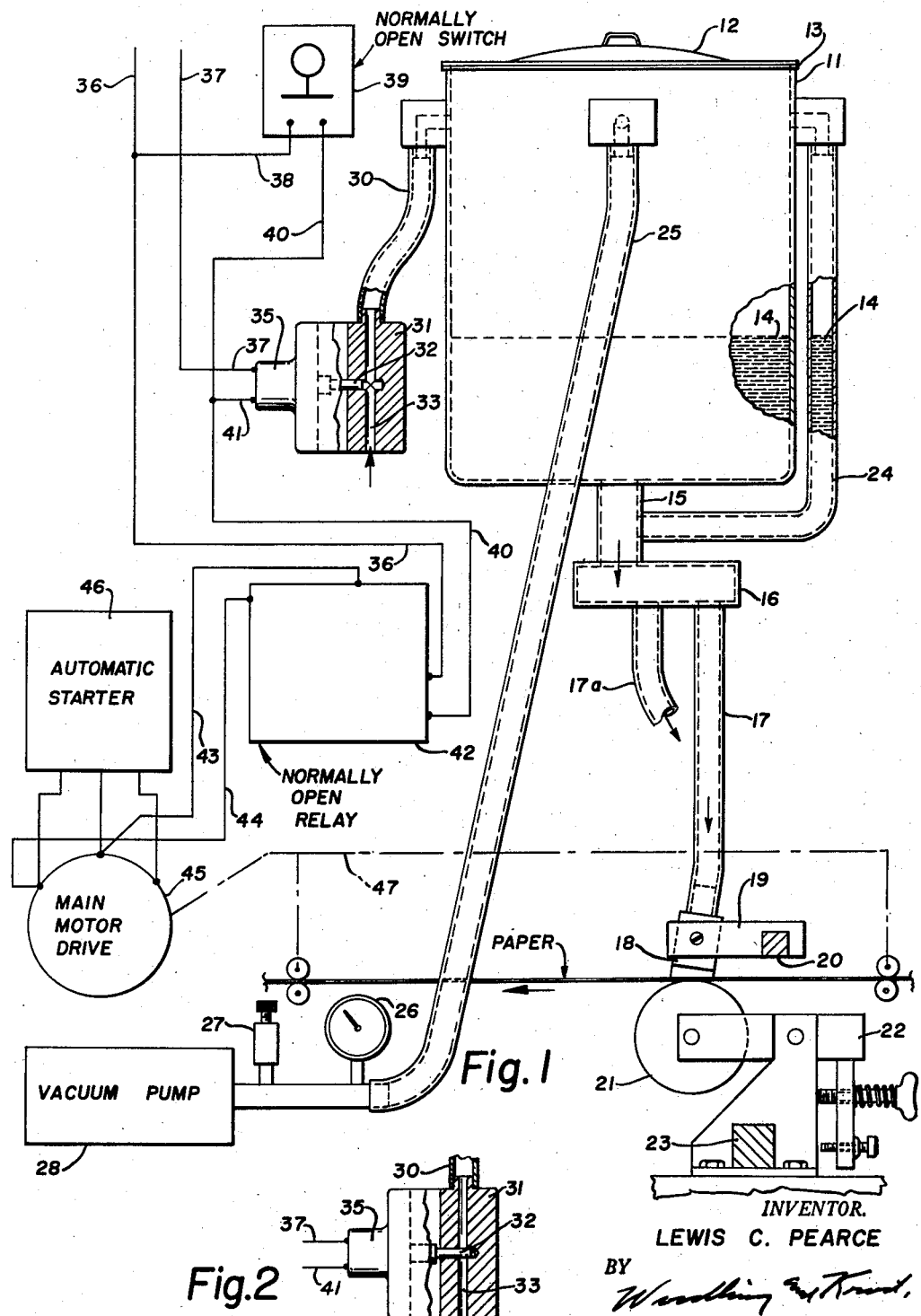

2,858,794

LIQUID DISPENSING DEVICE

Lewis C. Pearce, Berea, Ohio, assignor to Pearce Development Company, a corporation of Ohio Application March 30, 1956, Serial No. 575,118

10 Claims. (Cl. 118—11)

My invention relates to devices for dispensing and controlling the flow of a liquid fluid such as, for example, liquid gum adhesive.

A particular adaptation of my invention is for its use in apparatus in which a band or bands of gum adhesive is applied to a moving strip of paper stock as it progresses by a suitable conveyor system through an apparatus. Such paper stock may be used in the manufacture of stationery envelopes, labels, special tags and other articles upon which gum is to be applied at required locations. In some cases, one or two bands of gum of a prescribed width are applied to a continuously moving strip of paper stock. In such apparatus, one of the difficulties is that when movement of the paper stock is terminated, such as when the machine stops, the liquid gum continues to flow and to form a large globule or mass of liquid gum at one location. Another difficulty is that when the machine starts again and the paper is conveyed forwardly, the flow of liquid gum does not start fast enough to immediately discharge through the nozzle since the paper moves with a consequent lag in the flow of gum and a loss of some paper stock that has moved along before the gum is discharged from the nozzle.

An object of my invention is to overcome the above described short-comings in devices for dispensing and controlling the flow of liquid gum applied to a moving strip of paper stock.

Another object is the provision for immediately stopping the flow of gum from the discharge nozzle as soon as the electric motor driving the conveyor mechanism is stopped.

Another object is the provision for initiating the flow of liquid gum when desired to cause it to immediately be discharged from the nozzle as soon as the paper conveying mechanism is started.

Another object is the provision for automatically terminating the flow of liquid gum when paper stock is no longer being moved under a discharge nozzle.

Another object is the provision for manually operating the control means for a gum dispensing device so that the flow of liquid gum may be accelerated so as to be discharged upon moving paper stock as soon as there is forward movement of the paper stock through the apparatus.

Another object is the provision for using a vacuum for resisting the flow of liquid gum by gravity from a container to a discharge nozzle.

Another object is the provision for leakage of air into the container to neutralize or oppose a vacuum which resists the flow of liquid gum from a container to the discharge nozzle.

Another object is the provision of a unique and useful system for dispensing and controlling the flow of liquid.

Another object is the provision of an efficient and economical system for controlling the flow of liquid in accordance with the requirements for the discharge of the liquid.

Other objects and a fuller understanding of my invention may be had by referring to the following description and claims taken in conjunction with the accompanying drawing, in which:

Figure 1 is a side elevational view, partly in section and partly diagrammatical, illustrating my device; and Figure 2 is a view partly in section of the air leakage valve embodied in my device and showing the valve in closed position in contradistinction to its open position shown in Figure 1.

I illustrate my invention in association with apparatus wherein liquid gum is applied to a moving strip of paper stock and the invention will be described in connection with such an apparatus.

A closed container or reservoir 11 is positioned in the apparatus at an elevated location above a strip of paper stock being conveyed through the apparatus. This container 11 has a cover 12 suitable for the purpose of filling the container. A gasket seal 13 between the cover 12 and the container 11 hermetically closes the container from atmosphere.

A supply of liquid gum adhesive 14 is positioned in the container in the lower portion thereof as indicated so as to leave an empty space above a top level of the gum 14. Extending downwardly from the bottom of the container 11 is a pipe 15 which communicates with a distributing chamber 16 secured to and carried by the bottom of the pipe 15. Extending downwardly from and carried by the chamber member 16 are flexible conduits 17 and 17a. If but one band of gum adhesive is to be applied to the strip of paper, then only discharge conduit 17 is utilized. If an additional band of gum adhesive is to be applied to the paper strip, then both the conduit 17 and the conduit 17a are utilized. The conduits are flexible enough to be bent to desired angles and to required positions but are not flexible enough to collapse when subjected to any internal vacuum of the degree utilized in my apparatus. Preferably, the conduits 17 and 17a are of a transparent material, such as one of the clear or nearly clear plastics so that liquid gum flowing therein may be seen through the walls of the conduits.

Attached to the lower end of the conduit 17 and communicating therewith is a metal discharge nozzle 18. This nozzle has a downwardly directed orifice in communication with the atmosphere and directed over a strip of paper stock being advanced through the apparatus so as to discharge liquid gum in a relatively narrow band along the moving strip of paper. It is to be noted that the discharge nozzle is in communication with the bottom of the container 11 so that liquid gum 14 may flow downwardly by gravity from the container 11 through the pipe 15, through the chamber 16, through the conduit 17, and out through the orifice of the discharge nozzle 18. A similar nozzle is attached to the lower end of the conduit 17a but inasmuch as that nozzle is the same as the nozzle 18 on the lower end of the conduit 17, the drawing shows the conduit 17a as being cut off and the nozzle attached thereto is not shown. This elimination of the lower end of the conduit 17a and its associated nozzle is for the purpose of providing simplicity and clarity to the drawing.

To support the nozzles in position, a cross-bar 20 extends transversely of the apparatus above the moving strip of paper stock. A bracket 19 is secured to each nozzle 18 for supporting the nozzle in desired position. The bracket 19 may be moved along the length of the crossbar 20 for the purpose of locating the nozzle in respect to the paper. Also the nozzle may be angularly tipped relative to the bracket 19.

Positioned beneath the moving strip of paper stock and directly below the discharge nozzles is a pressure roll 21, adapted to hold the paper in its normal horizontal plane and in engagement with the bottom of the nozzles. This pressure roll 21 is held in position by an adjustable holder 22 which, in turn, is carried by a crossbar 23. By means of the adjusting bolts illustrated, the elevation of the pressure roll 21 may be adjusted. The coil spring around one of the adjusting bolts permits the holder 22 to resiliently yield upon downward movement on the pressure roll 21. Therefore, by the arrangement shown, the pressure roll 21 is resiliently urged upwardly toward the nozzle 18 on the other side of the paper stock.

For the purpose of providing a gauge to indicate the level of liquid gum 14 in the container, the tube 24 connects the downwardly directed pipe 15 with the space in the upper portion of the container 11. This gauge tube 24 is transparent to the degree required to disclose the level of liquid gum 14 therein. By this arrangement, the operator may be kept advised as to the amount of liquid gum remaining in the container.

Communicating with the space in the container above the level of the liquid 14 is a conduit 25. This conduit 25 may be of a flexible nature but is sufficiently self-supporting that it will not collapse when subjected to the vacuum of the degree utilized in my apparatus. The conduit 25 communicates with a vacuum pump 28 so that the vacuum created by the pump 28 in turn creates a similar vacuum in the top of the container above the liquid gum. A gauge 26 indicates the degree of the vacuum being created and a vacuum regulator 27 is provided for adjustably regulating the degree of vacuum being applied within the container 11. By means of the vacuum being created within the container 11 above the liquid gum 14, the downward flow of liquid gum by gravity through the conduit 17 is resisted or opposed. Inasmuch as the orifice of the discharge nozzle 18 is open to atmosphere, the downward flow of liquid gum is in relationship to the degree of vacuum created in the container. Also the degree of viscosity of the liquid gum has a relationship to the flow of gum by gravity as opposed by the vacuum created in the container.

Communicating with the interior of the container in the front portion thereof and above the level of the liquid is a conduit 30. This conduit 30 is connected at the lower end thereof to a valve made up of a valve body 31 and a movable valve piston stem 32. Movement of the piston stem 32 operates to open and close the orifice 33 of the valve body 31, which orifice 33 communicates with atmosphere. Therefore, whether the valve is open or closed to atmosphere depends upon the position of the piston stem 32 within the valve body 31. When the valve is in its open position, then air under atmospheric pressure enters the orifice 33 and moves through the conduit 30 into the space within the container 11 above the level of the liquid gum 14. When the valve is closed, then the interior of the container 11 is sealed off from atmosphere.

The valve made up of the valve body 31 and movable piston stem 32 is spring biased so as to be normally closed. In other words, the valve is of the type that the valve is normally closed unless and until actuated.

An electrically operated solenoid 35 is attached to the valve so as to operate the valve and move the piston stem 32 in opposition to its spring bias. When the solenoid 35 is electrically energized, the valve is opened to its position shown in Figure 1. When the solenoid 35 is de-energized, then the spring bias of the valve moves the valve to its closed position illustrated in Figure 2.

Electrical conductors or lines 36 and 37 are connected to a suitable source of electrical energy, such as a generator or other standard commercial source of electricity. Conductor 36 is in electrical connection with a normally open electrical relay 42.

A conductor 38 connected to the conductor 36 is connected to a normally open manually operable switch 39. Also connected to the switch 39 is a conductor 40 which is connected to the normally open electrical relay 42. A conductor 41 connected to the conductor 40 is also connected to the solenoid 35. Connected to and leading from the normally open relay 42 are conductors 43 and 44 which are in electrical connection with a main motor drive 45 and an automatic starter 46 associated with the main motor drive 45. The main motor drive 45 is adapted to drive a paper conveying mechanism 47 illustrated diagrammatically. The conveyor mechanism 47 moves the strip of paper stock forwardly through the machine between the nozzle 18 and pressure roll 21.

When the main motor drive 45 is stopped and the paper is no longer being moved forwardly by the conveying mechanism 47, the normally open relay 42 opens the circuit to the solenoid 35 of the normally closed valve. This closes the valve so that the interior of the container is closed off from atmospheric pressure. During the operation of the apparatus, the vacuum pump 28 is being continuously operated so that a vacuum is being continuously created in the space within the upper portion of the container 11 above the liquid gum. When air is no longer being leaked into the container 11 through the valve, then a vacuum to the degree created by the vacuum pump is present within the container. This vacuum within the container will oppose the downward flow of gum by gravity and draw the gum upwardly from the nozzles through the conduits 17 and 17a. This gum will be drawn up into the container 11 or part way up through the length of the discharge conduits away from the nozzles depending upon the amount and viscosity of the liquid gum in the container 11 and depending upon the degree of vacuum created in the container 11 by the vacuum pump 28. This upward drawing of the liquid gum causes immediate termination of discharge of liquid gum from the orifice of the discharge nozzle 18. Therefore immediately upon stopping of the forward movement of the paper by action of the main motor drive 45, the downward flow of liquid gum is terminated. This prevents the deposit of a large and undesirable mass or globule of liquid gum on the paper under the discharge nozzle 18.

At this point, the gum is either completely up in the container 11 or part way up in the conduits or lines leading to the discharge nozzles and if the machine is started by the start switch connected to the motor 45, there would be a loss of the amount of paper stock from the point of the gummed surface when the machine last stopped to the point where the liquid gum flowing by gravity again flowed through the discharge nozzle and on to the paper stock. This skipping or omission of a length of the paper stock from having gum applied thereto is caused by the inertia of the liquid gum and its viscosity in that the paper would move forwardly before the gum flowed down to the point where it was being discharged from the discharge nozzle. This undesirable situation due to the lag in the downward flow of the liquid gum is corrected by the use of the normally open switch 39. When the machine operator is ready to run the machine, he holds his finger on the button of the manually operable switch 39 which closes the circuit to the normally open relay 42, which has the same effect on the relay 42 as the motor circuit has without starting the main motor drive 45. By closing the circuit to the normally open relay 42, the solenoid 35 is actuated to open the valve and allow air to enter through the valve, the conduit 30, and into the container. This leakage of air into the container causes such air under atmospheric pressure to neutralize or oppose the vacuum being created in the container by the continuously running vacuum pump 28. In effect, the vacuum pump 28 is then drawing air from atmosphere through the open orifice of the valve, through the conduit 30, through the container 11 and through the conduit 25. As soon as the gum is flowing out through the discharge nozzle 18 by the operator actuating the switch 39, then the entire machine is put in motion by a push-button start switch which causes the main motor drive to be energized by the source of electrical energy in connection therewith. The energization of the main motor drive by the electrical energy flowing through the conductors 36 and 37 energizes the coil of the normally open relay 42. This closes the circuit and energizes the solenoid 35 to open the normally open valve, thus allowing the gum to start again to flow from the discharge nozzle 18 at the point where the gum had previously stopped when the operation of the machine was terminated. There is thus eliminated any wasted paper stock between the operations of the machine advancing the paper stock therethrough.

It is thus seen that the control of the liquid gum adhesive is assured so that only the desired flow of liquid gum is provided as the paper is conveyed forwardly by the apparatus. There is also assured by the apparatus disclosed that the flow of gum immediately terminates when the movement of the paper stock by the conveyor mechanism ceases. The apparatus also provides for starting the flow of liquid gum out through the discharge nozzle as soon as the paper stock moves forwardly so that there is no waste of paper stock between the previous stop of the apparatus and the renewal of movement of the paper stock through the apparatus.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Apparatus for dispensing and controlling the flow of a liquid fluid being applied in a band to a moving strip of stock, comprising in combination a closed container for said fluid, a nozzle for directing the fluid relative to a strip of moving stock, a fluid conduit from said container to said nozzle providing for feed of said fluid by gravity from the container to the nozzle, vacuum-producing means operating continuously during the operation of the apparatus, including the operation of dispensing the liquid through said fluid conduit and nozzle, said vacuum-producing means communicating with said container for reducing below atmospheric pressure the pressure of air in the container above the level of the fluid contained therein, valve means communicating with said container and with atmosphere for admitting air under atmospheric pressure into said container in opposition to said vacuum-producing means, and control means for controlling said valve means, said control means being arranged for automatic responsiveness to movement of said strip of stock through the apparatus, the admission by the valve means of air under atmospheric pressure to the container opposing the reduction of air pressure in the container by the vacuum-producing means and permitting said fluid to flow by gravity from the container through the said fluid conduit, the restriction by the valve means of air under atmospheric pressure from the container permitting the air under reduced pressure in the container to oppose the flow of fluid by gravity from the container through the fluid conduit.

2. Apparatus for controlling the flow of liquid fluid being dispensed comprising in combination enclosed reservoir means for containing a supply of the fluid, nozzle means through which the fluid is discharged, conduit means between the reservoir means and nozzle means to permit said fluid to flow by gravity from the container means to the nozzle means, vacuum-producing means operating continuously during the operation of the apparatus including the operation of dispensing the liquid through said conduit means and nozzle means, said vacuum-producing means communicating with said reservoir means for producing a relative vacuum in the reservoir means above the fluid therein, valve means for admitting air under atmospheric pressure into the reservoir means in opposition to said vacuum, and control means for operating said valve means, said control means including requirement-responsive means for automatically modifying the operation of the valve means in accordance with the requirements for discharge of fluid through the nozzle means, the flow of fluid by gravity from the reservoir means through the conduit means to the nozzle means being controlled by degree of vacuum in the reservoir means as determined by the opposing air under atmospheric pressure admitted to the reservoir means by said valve means.

3. In liquid gum dispensing apparatus for applying a band of the gum to a strip of material movable past the apparatus, said material being movable by a conveying mechanism, the combination of an enclosed container for containing a supply of liquid gum, conduit means for feeding the gum therethrough by gravity from the container to a location for applying said band of gum, said conduit means at said location being open to atmosphere, vacuum means for continuously reducing the pressure of air in the container above the gum, said reduced pressure opposing the gravity feed of gum from the container through the conduit means, valve means communicating with atmosphere for admitting air into the container to raise the pressure of air in the container above the gum in counter-balance to the reduction of air pressure by said vacuum means, control means for operating said valve means, and synchronizing means operatively connecting said control means and said conveying mechanism to operate the control means in accordance with operation of the conveying mechanism, said synchronizing means and control means terminating the admission of air through the valve means into the container upon termination of movement of the conveying mechanism whereupon the air under reduced pressure in the container and unopposed by air at atmospheric pressure opposes the flow of gum through said conduit means.

4. In liquid gum dispensing apparatus for applying a band of the gum to a strip of material movable past the apparatus, said material being movable by a conveying mechanism, the combination of an enclosed container for containing a supply of liquid gum, conduit means for feeding the gum therethrough by gravity from the container to a location for applying said band of gum, said conduit means at said location being open to atmosphere, vacuum means for continuously reducing the pressure of air in the container above the gum, said reduced pressure opposing the gravity feed of gum from the container through the conduit means, valve means communicating with atmosphere for admitting the air into the container to raise the pressure of air in the container above the gum in opposition to the reduction of air pressure by said vacuum means, control means for operating said valve means, synchronizing means operatively connecting said control means and said conveying mechanism to operate the control means in accordance with operation of the conveying mechanism, said synchronizing means and control means terminating the admission of air through the valve means into the container upon termination of movement of the conveying mechanism whereupon the air under reduced pressure in the container and unbalanced by air at atmospheric pressure opposes the flow of gum through said conduit means, and manually operated means for operating said control means independently of said synchronizing means to permit operation of the valve means for admitting air through the valve means into the container prior to movement of the conveying mechanism.

5. Apparatus for controlling the feed of liquid fluid to a strip of stock being moved by mechanism driven by an electric motor having a circuit adapted to be connected with a source of electrical energy, comprising in combination an enclosed container adapted to contain said liquid fluid in a bottom portion thereof and to have a space within the container above the liquid fluid, an open nozzle adapted to discharge the fluid upon said stock as the stock is moved relative to the nozzle, conduit means connecting the container and nozzle to permit the said fluid to flow by gravity from the container to the nozzle and therethrough, a vacuum pump in communication with the interior of the container and adapted to reduce the pressure of air in said space above the said fluid continuously during operation of said mechanism, valve means for leaking air under atmospheric pressure into said container, and control means for operating said valve means, said control means being responsive to flow of current in said circuit whereby the valve means is operated by the control means to diminish said leakage of air upon stoppage of said mechanism and to thereby provide for greater reduction of pressure in said space.

6. Apparatus for controlling the feed of liquid fluid to a strip of stock being moved by mechanism driven by an electric motor having a circuit adapted to be connected with a source of electrical energy, comprising in combination an enclosed container adapted to contain said liquid fluid in a bottom portion thereof and to have a space within the container above the liquid fluid, an open nozzle adapted to discharge the fluid upon said stock as the stock is moved relative to the nozzle, conduit means connecting the container and nozzle to permit the said fluid to flow by gravity from the container to the nozzle and therethrough, a vacuum pump in communication with the interior of the container and adapted to reduce the pressure of air in said space above the said fluid continuously during operation of the mechanism, valve means for leaking air under atmospheric pressure into said container in counter-balance to said reduction of air pressure, control means for operating said valve means, said control means being responsive to flow of current in said circuit whereby the valve means is automatically operated by the control means to diminish said leakage of air upon stoppage of said mechanism and to change said counter-balance to reduction of air pressure, and manually operated means for modifying the operation of said control means whereby the valve means may be operated to leak air under atmospheric pressure to the container as required.

7. In dispensing apparatus for applying liquid gum odhesive in a band to a strip of paper stock moved along by a mechanism comprising in combination reservoir means for containing a supply of the liquid gum adhesive, conduit means communicating with the reservoir means for carrying the adhesive by gravity to a point of discharge over the moving paper stock, vacuum means communicating with the reservoir means continuously during the operation of the mechanism, including during the said carrying of adhesive by the conduit means to said point of discharge, said vacuum means providing a vacuum in the reservoir means for resisting the flow of said adhesive by gravity, air-leakage means communicating with the reservoir means for opposing said vacuum means to counter-balance said resistance to flow, and control means responsive to operation of said mechanism for controlling the said air-leakage means.

8. In dispensing apparatus for applying liquid gum adhesive in a band to a strip of paper stock moved along by a mechanism comprising in combination reservoir means for containing a supply of the liquid gum adhesive, conduit means communicating with the reservoir means for carrying the adhesive by gravity to a point of discharge over the moving paper stock, vacuum means communicating continuously during operation of the mechanism, including during the said carrying of adhesive by the conduit means to said point of discharge, with the reservoir means for providing resistance to the flow of said adhesive by gravity, air-leakage means communicating with the reservoir means for opposing said vacuum means and providing counter-action to said resistance, control means for controlling the said air-leakage means, and synchronizing means operatively connected to and responsive to operation of said mechanism for effecting the operation of said control means.

9. In dispensing apparatus for applying liquid gum adhesive in a band to a strip of paper stock moved along by a mechanism comprising in combination reservoir means for containing a supply of the liquid gum adhesive, conduit means communicating with the reservoir means for carrying the adhesive by gravity to a point of discharge over the moving paper stock, vacuum means communicating with the reservoir means continuously during operation of the mechanism, including during the said carrying of adhesive by the conduit means to said point of discharge, for resisting the flow of said adhesive by gravity, air-leakage means communicating with the reservoir means for opposing said vacuum means to counter-balance said resistance to flow, control means for controlling the said air-leakage means, synchronizing means operatively connected to and responsive to operation of said mechanism for effecting the operation of said control means, and manually operable means for effecting the operation of said control means.

10. In gumming apparatus for moving paper stock, the combination of delivery means for delivering liquid gum to said paper stock, vacuum means continuously resisting said delivery means during operation of the apparatus to oppose the said delivery of said liquid gum, air-leakage means in communication with the delivery means for resisting said vacuum means to permit the delivery means to operate upon operation of the air-leakage means, and control means responsive to movement of the paper stock by said apparatus for operating the air-leakage means to provide for delivery of liquid gum in accordance with the movement of the paper stock.

References Cited in the file of this patent

UNITED STATES PATENTS

| | | |
|---|---|---|
| 1,308,091 | Maurer | July 1, 1919 |
| 1,673,247 | Keith | June 2, 1928 |
| 1,712,877 | Ehlers | May 14, 1929 |
| 1,996,944 | Witter | Apr. 9, 1935 |
| 2,123,354 | Corse | July 12, 1938 |
| 2,203,910 | Issartel et al. | June 11, 1940 |
| 2,284,641 | Cox et al. | June 2, 1942 |
| 2,293,252 | Foster et al. | Aug. 18, 1942 |
| 2,580,256 | Tacchella | Dec. 25, 1951 |